United States Patent
Hu et al.

(10) Patent No.: US 7,715,607 B2
(45) Date of Patent: May 11, 2010

(54) AUTOMATED METHOD FOR IDENTIFYING LANDMARKS WITHIN AN IMAGE OF THE BRAIN

(75) Inventors: Qingmao Hu, Rajawali (SG); Wieslaw Lucjan Nowinski, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 1268 days.

(21) Appl. No.: 10/550,366

(22) PCT Filed: Jul. 26, 2004

(86) PCT No.: PCT/SG2004/000219
§ 371 (c)(1),
(2), (4) Date: Sep. 20, 2005

(87) PCT Pub. No.: WO2006/011850
PCT Pub. Date: Feb. 2, 2006

(65) Prior Publication Data
US 2006/0251310 A1    Nov. 9, 2006

(51) Int. Cl.
*G06K 9/00* (2006.01)
(52) U.S. Cl. .................................................. 382/131
(58) Field of Classification Search ............... 382/131
See application file for complete search history.

(56) References Cited

U.S. PATENT DOCUMENTS 6,226,418 B1 * 5/2001 Miller et al. ............... 382/294
6,408,107 B1   6/2002 Miller et al.
6,491,702 B2 * 12/2002 Heilbrun et al. ............ 606/130
6,591,004 B1 *  7/2003 VanEssen et al. .......... 382/154
7,450,983 B2 * 11/2008 Weiss ......................... 600/410
2008/0170791 A1 *  7/2008 Eskildsen et al. .......... 382/199

FOREIGN PATENT DOCUMENTS

WO    WO 02/43003 A1    5/2002

(Continued)

OTHER PUBLICATIONS

Nowinski, W. L., Modified Talairach Landmarks Technical Report, Acta Neuochir, Springer-Verlag, 2001, 143, Austria, pp. 1045-1057.

(Continued)

*Primary Examiner*—Wenpeng Chen
(74) *Attorney, Agent, or Firm*—Fitch, Even, Tabin & Flannery

(57) ABSTRACT

A method is disclosed for obtaining the location of a landmark in an MR image of a brain. In a first step, a region of interest in a plane within the MR image containing the landmark is defined. In a second step, the ROI is binarised into foreground and background voxels based on at least one threshold selected using anatomical knowledge. In a third step a set of object voxels is identified from the foreground voxels, excluding voxels which were only classified as object due to proximity of cortical and non-cortical structures. This can be done by morphological processing which reclassifies voxels which may have been incorrectly classified as object, followed by restoring voxels due to the partial volume effect and/or morphological erosion/opening. In a fourth step, an automatic process is then carried out to identify one or more landmarks in the modified binarised image.

19 Claims, 5 Drawing Sheets

FOREIGN PATENT DOCUMENTS

WO     WO 03/060827 A1     7/2003

OTHER PUBLICATIONS

Cox, Robert W., AFNI: Software for Analysis and Visualization of Functional Magnetic Resonance Neuroimages, Computers and Biomedical Research 29, (1996), Article No. 0014, pp. 162-173.

Brummer, Marjin E.; Mersereau, Russell M.; Eisner, Robert L. and Lewine, Richard R. J., Automatic Detection of Brain Contours in MRI Data Sets, IEEE Transactions on Medical Imaging, vol. 12, No. 2, Jun. 1993, pp. 153-166.

Grachev, Igor D.; Berdichevsky, Dmitriy; Rauch, Scott L., Heckers, Stephan, Kennedy, David N., Caviness, Verne S. and Alpert, Nathanial M., A Method for Assessing the Accuracy of Intersubject Registration of the Human Brain Using Anatomic Landmarks, NeuroImage, 9, 1999, pp. 250-268.

Brinkley, J. F. and Rosse, C., Imaging Informatics and the Human Brain Project: the Role of Structure, Review Paper, Yearbook of Medical Informatics, 2002, pp. 131-148.

Nowinski, Wieslaw L., D. SC., Ph.D., and Thirunavuukarasuu, Arumugam, B.Sc., A locus-driven mechanism for rapid and automated atlas-assisted analysis of functional images by using the Brain Atlas for Functional Imaging, Neurosurg Focus 15 (1): Article 3, 2003, vol. 15, Jul. 2003, pp. 1-7.

Nowinski, Wieslaw L., The Cerefy Neuroradiology Atlas: a Talairach-Tournoux atlas-based tool for analysis or neuroimages available over the Internet, NueroImage 20, 2003, pp. 50-57.

Lancaster, Jack L., Woldorff, Marty G., Parsons, Lawrence M., Liotti, Mario, Freitas, Catarina S., Rainey, Lacy, Kochunov, Peter V., Nickerson, Dan, Mikiten, Shawn A. and Fox, Peter T., Automated Talairach Atlas Labels for Functional Brain Mapping, Human Brain Mapping 10, Wiley-Liss, 2000, pp. 120-131.

Sandor, Stephanie and Leahy, Richard, Surface-Based Labeling of Cortical Anatomy Using a Deformable Atlast, IEEE Transactions of Medical Imaging, vol. 16, No. 1, Feb. 1997, pp. 41-54.

Magnotta, Vincent A., Bockholt, H. Jeremy, Johnson, Hans J., Christensen, Gary E. and Andreasen, Subcortical, cerebellar, and magnetic resonance based consistent brain image registration, Science Direct, NeuroImage 19 (2003) pp. 233-245.

Nowinski, Wieslaw L., Ph.D.; Fang, Anthony, B.Sc.; Nguyen, Bonnie T., M.Sc.; Raphel, Jose K., Ph.D.; Jagannathan, Lakshimipathy, B.Sc.; Raghavan, Raghu, Ph.D., Bryan, R. Nick, M.D., Ph.D.; and Miller, Gerald A., Ph.D., Multiple Brain Atlas Database and Atlas-Based Neuroimaging System, Biomedical Paper, Computer Aided Surgery, 2:42-66 (1997).

Aronen, H. J.; Korvenoja, A..; Martinkauppi, S.; Perkio, J.; Karonen, J. and Carlson, S., Clinical Applications of Functional Magnetic Resonance Imaging, International Journal of Bioelectromagnetism, vol. 1, No. 1, pp. 23-34, 1999.

Nowinski, W.L., Model-enhanced neuroimaging: clinical, research, and educational applications, Review Paper, Yearbook of Medical Informatics 2002, pp. 118-130.

\* cited by examiner

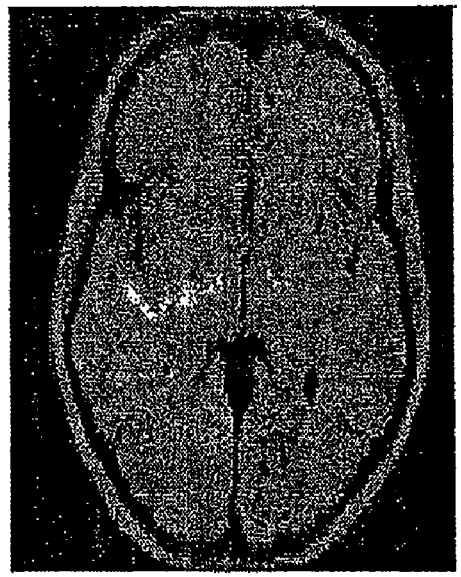
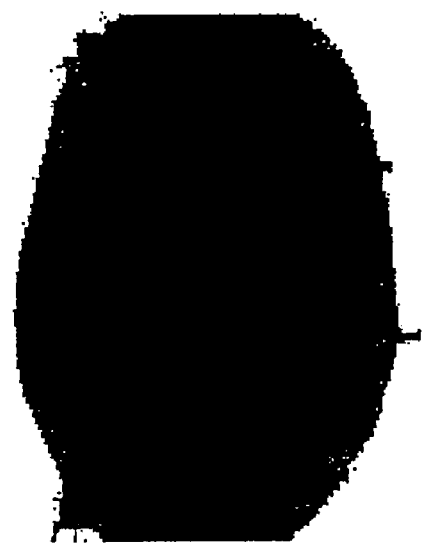
FIG. 3a          FIG. 3b
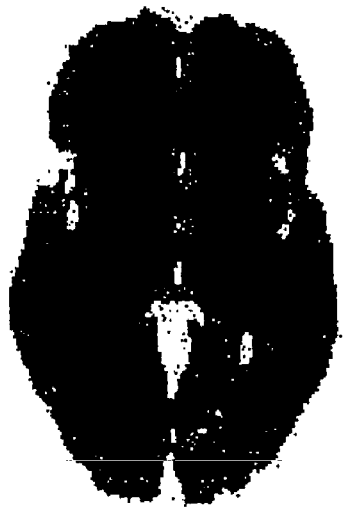
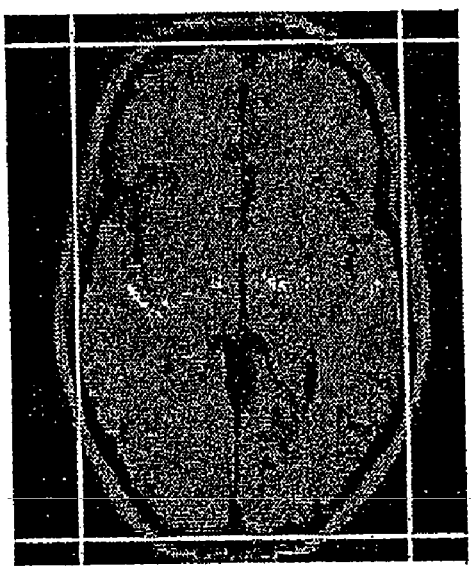
FIG. 3c          FIG. 3d

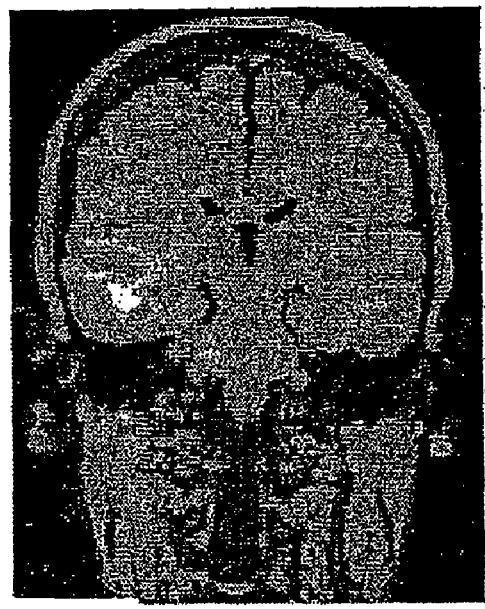 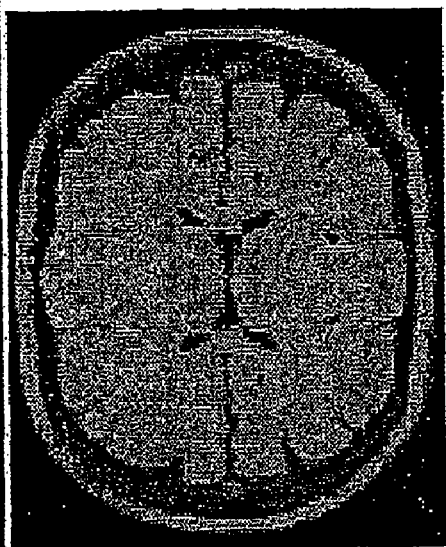
FIG. 4a  FIG. 4b
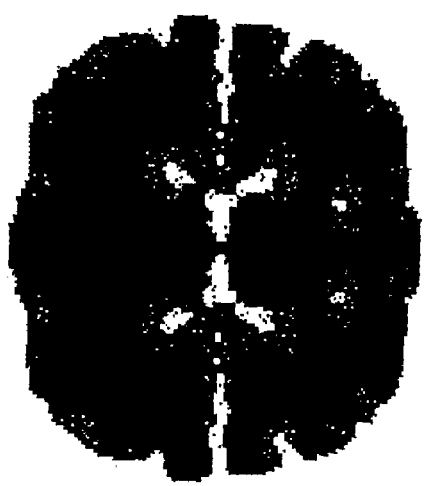 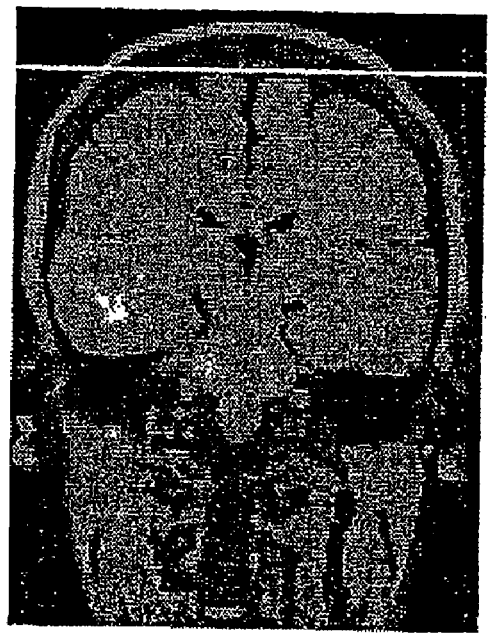
FIG. 4c  FIG. 4d

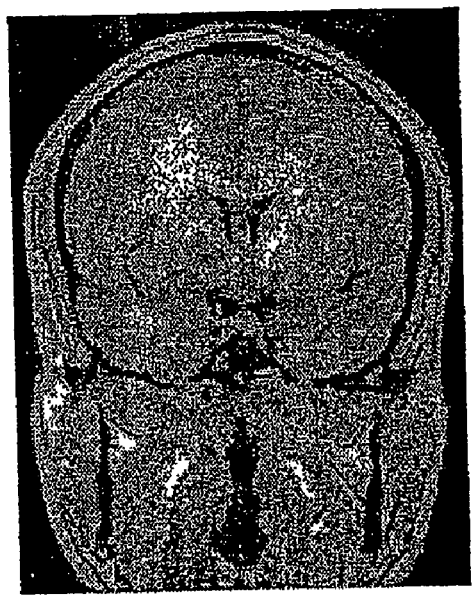
FIG. 5a
FIG. 5b
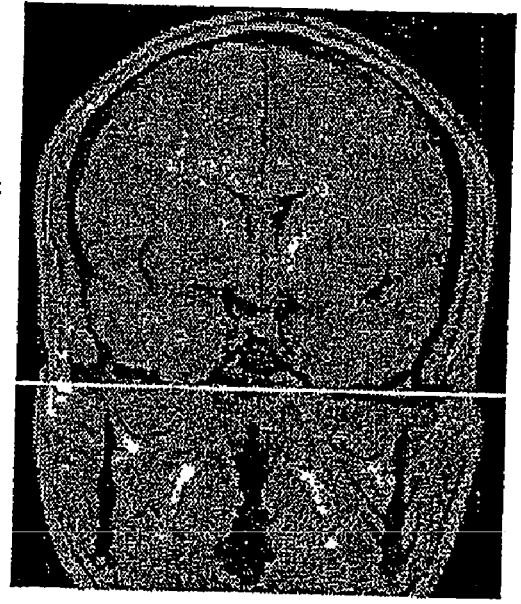
FIG. 5c
FIG. 5d

AUTOMATED METHOD FOR IDENTIFYING LANDMARKS WITHIN AN IMAGE OF THE BRAIN

FIELD OF THE INVENTION

The present invention relates to methods for automatically identifying landmarks within images of a brain.

BACKGROUND OF INVENTION

The Talairach transformation is widely used for analysis of neurological images. It involves identifying eight landmarks, which are used to define a coordinate system. The Talairach landmarks subdivide the brain into 12 cuboids, and the Talairach transformation is to warp the images within each cuboid linearly. In this way the brain images are normalised by a three-dimensional piece-wise linear warping. This scheme has several applications, in particular because it makes it possible to compare neurological images from different individuals. One improvement on this scheme, while following its conceptual rationale, is the improvement of the definitions of the landmarks, to give "modified Talairach landmarks" (as defined in the article "Modified Talairach Landmarks", W. L. Nowinski, Acta Neurochirurgica, 2001, 143, p 1045-1057, In summary, the modified Talairach landmarks are derived by introducing three intercommissural distances: central, internal and tangential. Although these modified Talairach landmarks are conceptually equivalent to the original Talairach landmarks, they have several advantages and overcome some limitations of the original Talairach landmarks.

A principal advantage of the Talairach transform is its simplicity. Although numerous non-linear image registration techniques are known, in principle providing a higher accuracy, the non-linear techniques have limitations which make them difficult to use beyond a research environment. In particular, a prohibitively high computational time is required. Whereas the Talairach transformation can be performed in less than a second in a standard personal computer, some non-linear methods require days of computation. More fundamentally, the non-linear methods are conceptually complex, and must be treated as "black boxes", which limits their clinical acceptance.

Furthermore, there is no established methodology for validation of the non-linear registration techniques.

One drawback of the Talairach transformation, however, is that the identification of the landmarks has not so far been automated reliably, so that when using conventional software which employs the Talairach transformation the landmarks still have to be identified by user interaction (e.g. R. W. Cox, "AFNI: Software for Analsysis and Visualization of Functional Magnetic Resonance Neuroimages", Computer and Biomedical Research, 1996, 29, p 162-173). Quite apart from the time the interactive identification of the landmarks takes, different individuals are liable to locate the landmarks in slightly different positions, which reduces the robustness of the method.

SUMMARY OF THE INVENTION

The present invention aims to provide new and useful techniques and apparatus for identifying automatically landmarks within neurological images, and in particular the Talairach landmarks or modified Talairach landmarks.

The invention makes use of the concepts "foreground voxels" and "background voxels". "Binarising" a set of voxels means to divide the voxels into these two categories. Furthermore, certain voxels are "object voxels". Object voxels are voxels in a location which corresponds to a physical identity (cerebral structure), such as, in the context of this invention, the union of grey matter and white matter.

In general terms, the invention proposes that the location of one or more landmarks is obtained by the following steps:

(a) a region of interest in a plane within an MR image of a brain and containing the landmark(s), is identified;

(b) the region of interest is binarised into foreground and background voxels based on at least one threshold selected using anatomical knowledge, (c) a set of object voxels is identified from the foreground voxels, excluding voxels which were only classified as foreground voxels due to proximity of cortical and non-cortical structures, (d) object voxels are identified from the background voxels due to the partial volume effect and morphological erosion/opening, and (e) an automatic process is then carried out to identify one or more landmarks in the modified binarised image.

The step of reclassifying voxels may be performed in two stages: (i) a first stage of morphological processing, and (ii) a second step of restoring voxels which have been incorrectly reclassified in the morphological processing.

Anatomical knowledge may also be used in the reclassifying step, e.g. by using the expected shapes of cortical and/or non-cortical structures to modify the classification.

The threshold is preferably selected by the steps of:

(i) using prior knowledge about the image to derive an intensity range of voxels in the said region of interest;

(ii) obtaining a frequency distribution of the intensities within the said intensity range of voxels within the said region of interest; and (iii) using the said frequency distribution to derive the threshold.

The intensity threshold may be selected by minimising a function which is a sum of the variances of the intensities below and above the threshold.

Optionally, this function may be a weighted sum defined based on two constants $W_1$ and $W_2$. This is referred to here as a "range constrained weighted variance method".

For example, labelling the possible values of voxel intensity by an integer index i and their respective frequencies by $h(i)$, and writing the lower and upper intensities respectively as $r_{low}$ and $r_{high}$, the weighted sum is given by $$\theta_{RCLWV}(W_1, W_2) = \max_{r_k}(Pr(C_1)D(C_1)W_1 + Pr(C_2)D(C_2)W_2),$$

where $Pr(.)$ denotes the class probability $$\left(Pr(C_1) = \sum_{i=r_{low}}^{r_k} h(i) \text{ and } Pr(C_2) = \sum_{i=r_k+1}^{r_{high}} h(i)\right),$$

and $D(C_1)$ and $D(C_2)$ are given by:

$$D(C_1)=(\mu_0-\mu_T)^2 \text{ and } D(C_2)=(\mu_1-\mu_T)^2, \text{ where}$$

$$\mu_T = \sum_{i=r_{low}}^{r_{high}} i \times h(i),$$

$$\mu_0 = \sum_{i=r_{low}}^{r_k} i \times h(i)$$

and $$\mu_1 = \sum_{i=r_k+1}^{r_{high}} i \times h(i).$$

The steps (a) to (d) may be performed repeatedly for different landmarks. One or more landmarks may be located for each of the starting planes of the MR image.

In the case of identifying the I landmark (which is a position on a coronal plane) the left and right halves of the brain may be treated partly separately, such that the I landmark is identified using the half of the brain which appears to have been segmented more accurately.

The invention may be expressed as a computer-implemented method, or alternatively as a computer system arranged to perform such a method.

BRIEF DESCRIPTION OF THE FIGURES

Preferred features of the invention will now be described, for the sake of illustration only, with reference to the following figures in which:

FIG. 3, which is composed of FIGS. 3(*a*) to 3(*d*), shows an example of performing the steps to identify the A, P, L and R landmarks in the method of FIG. 1;

FIG. 4, which is composed of FIGS. 4(*a*) to 4(*d*), shows an example of performing the steps to identify the S landmark in the method of FIG. 1; and FIG. 5, which is composed of FIGS. 5(*a*) to 5(*d*), shows an example of performing the steps to identify the I landmark in the method of FIG. 1

DETAILED DESCRIPTION OF THE EMBODIMENTS

Figure 1:
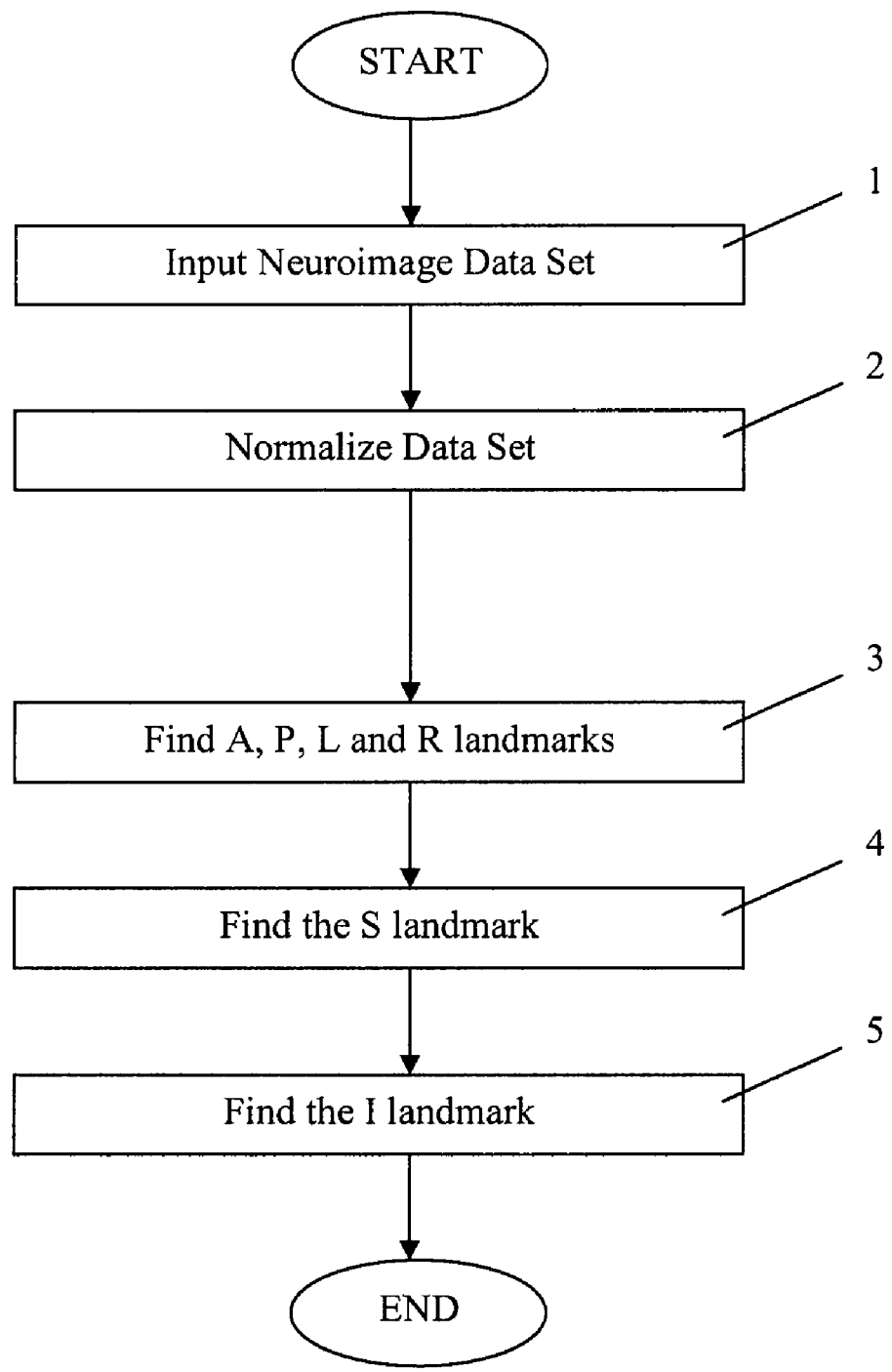
FIG. 1 is a flow chart of a method which is an embodiment of the invention.

Referring firstly to FIG. 1, the steps of a method which is an embodiment of the invention are shown.

In step 1, a dataset which is a neuroimage (i.e. an image of a brain) is loaded. This image is a three dimensional data, typically obtained from a number of scans in different respective planes.

From this data, the midsagittal plane (MSP) is determined. This is preferably done using the method disclosed in WO02/069827, "Method and apparatus for determining symmetry in 2D and 3D images", by Hu and Nowinski In summary, the method disclosed in WO02/069827 includes the steps of (1) determining axial slices to be further processed for fissure line segments, (2) approximating fissure line segments in axial slices by optimization of local symmetry index and fissure pattern measure, and (3) calculating the plane equation of MSP from the approximated fissure line segments via histogram analysis. However, the invention is not limited in this respect, and any other technique for determining the MSP may also be applied. Indeed, it would also be possible within the scope of the invention for the input data to specify the MSP.

The coordinates of the anterior commissure (AC) and posterior commissure (PC) are then determined automatically. This can be done by the method disclosed in WO02/43003, "Methods and apparatus for processing medical images", by Nowinski and Thirunavuukarasuu, although once more the invention is not limited in this respect. In summary, the method disclosed in WO02/43003 calculates the coordinates of the AC and PC using peaks and valleys of a graph of the density profile of the image measured along a line or peaks and valleys of a projection along a specified direction.

In step 2 of FIG. 1, the data is normalised to occupy a predefined gray-scale range. According to the standard radiological convention, we write the coordinate system as (x,y,z), where the x-axis is from the subject's right to left, the y-axis is from anterior to posterior, and z from superior to inferior. Thus, an xz-plane is a coronal plane, a yz-plane is a sagittal plane, and an xy-plane is an axial plane. Let g(x,y,z) denote the gray level of the input data at a voxel at position (x,y,z), and let $g_o$ and $g_1$ denote the grey levels such that one percent of the voxels have an intensity less than $g_0$ and one percent of the voxels have an intensity greater than $g_1$. Then, we obtain a normalised gray level ĝ(x,y,z) which, for a given position (x,y,z) is given by:

$$\hat{g}(x, y, z) = 0 \quad \text{if } g(x, y, z) \le g_0$$
$$\hat{g}(x, y, z) = \frac{g(x, y, z) - g_0}{g_1 - g_0} \quad \text{if } g_0 < g(x, y, z) < g_1$$
$$\hat{g}(x, y, z) = 255 \quad \text{if } g(x, y, z) \ge g_1$$

Each slice of the normalised data has its own co-ordinate system (u,v) where u is the horizontal direction and v is the vertical direction.

In step 3, the position of the A, P, L and R landmarks is located. This is done by the series of steps shown in FIG. 2.

Firstly, in step 3.1 a region of interest (ROI) is defined. These may be the voxels within the skull. These voxels can be determined by the following steps:

(a) A histogram-based thresholding method is used to binarise the AP plane (as used for example in M. E. Brummer, R. M. Mersereau, R. L. Eisner, R. J. Lewine, "Automatic detection of brain contours in MRI data sets", IEEE Transactions on Medical Imaging 1993; 12(2), p 153-166).

(b) A morphological closing operation is performed using a 3×3 structuring element (SE) to connect small gaps in the ROI.

(c) The largest connected component is identified, and the holes within the component are filled.

FIG. 3(*a*) shows the AP plane in a typical example of the use of this method. FIG. 3(*b*) shows the corresponding ROI.

In step 3.2 an optimum threshold is determined, based on the range-constrained weighted variance thresholding method. This includes the following steps, which are explained in a separate patent application by two of the present inventors: "Methods and apparatus for binarizing images", Singapore patent application 200307531-4, by Q. M. Hu, Z. Hou, and W. L. Nowinski, which was still unpublished at the priority date of the present application.

Firstly, prior knowledge of the image is used to define an ROI which is a subset of the image. This process can be done by whatever means, either automatic, semi-automatic, or even manual. Then an analysis is performed on the frequency of occurrence of intensities within the ROI, and a range of frequencies is defined, again using prior knowledge.

For example, without losing generality, we denote the image to be processed as f(x), where f(x) is the gray level at a voxel labelled x. It is further supposed that the processed image has L gray levels denoted by $r_i$ where i is an integer in the range 0 to L–1 and $r_0 < r_1 < \ldots r_{L-}$. It is also assumed that the object of interest has higher intensity values than the background. Suppose that due to prior knowledge or test we know that the proportion of the ROI which is occupied by the object is in the percentage range $per_0$ to $per_1$.

Let h(i) denote the frequency of gray level $r_i$, and let H(i) denote the cumulative frequency which is $$\sum_{i'=0}^{i} h(i'),$$

where i' is an integer dummy index. Considering two values of i written as m and n, the frequency of intensities in the range $r_m$ to $r_n$ is $$\sum_{i'=m}^{n} h(i').$$

Thus, we can use $per_0$ to calculate a gray level $r_{low}$, such that we are sure that all the voxels having lower intensity represent background. $r_{low}$ can be written as:

$$r_{low} = \min_i \{i \mid H(i) \geq per_0\}. \quad (1)$$

Similarly, we can use $per_1$ to calculate a gray level $r_{high}$ such that we are sure that all voxels having higher intensity represent the object:

$$r_{high} = \min_i \{i \mid H(i) \geq per_1\}. \quad (2)$$

Let $r_k$ fall within the range $r_{low}$ to $r_{high}$, and suppose that the voxels of the ROI are in two classes $C_1$ and $C_2$, where $C_1$ is voxels of the background class and consists of voxels with gray levels $r_{low}$ to $r_k$, and $C_2$ is voxels of the object class and is composed of voxels with gray levels $r_k+1$ to $r_{high}$. The range-constrained weighted variance thresholding method maximises the "weighted between-class variance" defined as:

$$\theta_{RCWV}(W_1, W_2) = \max_{r_k} (Pr(C_1)D(C_1)W_1 + Pr(C_2)D(C_2)W_2),$$

where $W_1$ and $W_2$ are two positive constants selected by the user and representing the weights of the two respective class variances, Pr(.) denotes the class probability, i.e.

$$Pr(C_1) = \sum_{i=r_{low}}^{r_k} h(i),$$

-continued $$Pr(C_2) = \sum_{i=r_k+1}^{r_{high}} h(i),$$

and $D(C_1)$ and $D(C_2)$ are given by:

$D(C_1) = (\mu_0 - \mu_T)^2$ and $D(C_2) = (\mu_1 - \mu_T)^2$, where $$\mu_T = \sum_{i=r_{low}}^{r_{high}} i \times h(i),$$

$$\mu_0 = \sum_{i=r_{low}}^{r_k} i \times h(i) \text{ and } \mu_1 = \sum_{i=r_k+1}^{r_{high}} i \times h(i).$$

When $W_1$ is bigger than $W_2$, background homogeneity is emphasised.

Step 3.2 may be done by specifying $per_0$ and $per_1$ to be 14% and 28% respectively. The optimum threshold is denoted as $\theta_1$.

In step 3.3, we segment the AP plane by assigning voxels to foreground if they are bigger than $\theta_1$, and otherwise assigning them to background. The binarised image is denoted as BWAP1 (u,v).

In steps 3.4 we reclassify the voxels: firstly by a morphological processing, then processing using anatomical knowledge, and finally performing a restoring step.

The sub-steps of the morphological processing and processing using anatomical knowledge are as follows:

(a) A distance transform of the ROI is performed using the 2-3 metric (in this metric the distances between any two voxels is determined by defining the shortest path of voxels between them, and adding the distance increments along this path. The distance increments between two voxels which are nearest neighbours in a direction parallel to one of the axes (4-connected nearest neighbours) is taken as 2, and the distance between two voxels which are nearest neighbours diagonally (8-connected nearest neighbours) is taken as 3) and the distance codes are converted into distance indices by the method of Hu Q. M., "Two and three-dimensional skeletonization", WO 02/058008). The maximum distance index is denoted as maxDSkull.

(b) A morphological opening operation is performed with a 3×3 SE with respect to BWAP1 (u, v), to obtain BWAP2(u, v).

(c) A morphological opening operation is performed with a 5×5 SE with respect to BWAP1(u,v) to obtain BWAP3(u,v).

(d) The foreground components of BWAP3(u,v) are found. For each foreground component, its minimum and maximum distance indices are denoted as minD and maxD respectively. A foreground component is treated as an object component when maxD-minD is bigger than a value (e.g. 20) or maxD is bigger than a second value (e.g. maxDSkull/2).

(e) The object voxels are excluded from the foreground voxels of BWAP2(u,v). The connected foreground components of BWAP2(u,v) are found. The number of voxels of each foreground component are denoted as nosVoxel. A foreground component of BWAP2(u,v) is categorised as an object component only when the shape of the component is not similar to meninges. According to anatomical knowledge, meninges have a shape similar to the skull and are quite thin. So, when maxD-minD is smaller than 0.1*nosVoxel, the component is highly likely to be a meninges. Otherwise, it is classified as an object component.

The lost object voxels are restored by the following steps:

(a) Object voxels far from the skull lost due to the morphological opening operation are restored. This is achieved by checking the non-object voxels with a distance index greater than maxDSkull/4. If their gray level is bigger than $\theta_1$, the voxels are reclassified as object voxels.

(b) Object voxels around the boundaries lost due to the morphological opening operation are restored. For each object boundary voxel (an object boundary voxel is an object voxel having at least one non-object voxel as one of its 8 immediate neighbours), each of its 8 immediate neighbours is reclassified as an object voxel if its grey level is greater than $\theta_1$.

Note that this restoration is not performed around the most anterior (i.e. minimum v) and most posterior (i.e. maximum v) parts of the straight line connecting AC and PC, to avoid the sinus and meninges. Specifically, suppose the maximum and minimum v coordinates of object voxels are minVap and maxVap respectively, and denote the coordinates of AC on the AP plane as (acUap,acVap) and the coordinates of the PC on the AP plane as (pcUap, pcVap). The restoration is not carried out in the following two regions:

$$|u-acUap|<10 \text{ mm and } |v \oplus minVap|<3 \text{ mm.} \quad (3)$$

$$|u-pcVap|<10 \text{ mm and } |v-maxVap|<3 \text{ mm,} \quad (4)$$

where |x| stands for the absolute value of x.

(c) Object voxels (that is, all voxels which are physically either GM or WM) lost due to the partial volume effect are restored. Since the statistics of GM, WM, CSF, air, meninges and bones are not available, the partial volume effect is alleviated by reducing the threshold by 10. That is, for any object boundary voxel, each of its immediate 8 neighbours is reclassified as an object voxel if its gray level is bigger than $(\theta_1-10)$. The restoration is not carried out in the two regions defined by formulae (3) and (4).

In step 3.5, the minimum and maximum v coordinates of the object voxels are taken respectively as the v coordinates of the A and P landmarks respectively. Similarly, the minimum and maximum u coordinates of the object voxels are taken as the u coordinates of the L and R landmarks respectively. Note that the u-coordinate in the AP plane corresponds to the x-coordinate of the three-dimensional volume, and the v-coordinate in the AP plane corresponds to the y-coordinate in the three-dimensional volume.

FIGS. 3(c) and 3(d) show the segmented AP plane, and the 4 landmarks overlaid over it. The white horizontal lines show the v coordinates of the A and P landmarks, while the white vertical lines shown the u coordinates of the L and R landmarks on the AP plane.

In step 4 of FIG. 1, we determine the position of the S landmark. The VPC plane is a coronal slice perpendicular to both the MSP and the AP plane, and it passes through the PC. To determine the position of the S landmark, we only need to determine its v co-ordinate. The v coordinate of the S landmark is the smallest v coordinate of all the cortical voxels on the VPC plane. The S landmark is localized by segmentation of a virtual slice aVPC(u,v) with the close skull.

The VPC plane is denoted as VPC(u,v), the coordinates of the PC within VPC(u,v) are denoted as (pcU, pcV).

In step 4.1, a virtual plane aVPC(u,v) is constructed in the following way:

(a) aVPC(u,v)=VPC(u,v) when v is not bigger than pcV.

(b) aVPC(u,v)=VPC(u,2pcV-v) when v is bigger than pcV and smaller than 2pcV.

FIGS. 4(a) and 4(b) show a VPC and the corresponding virtual slice aVPC.

In step 4.2, the ROI corresponding to aVPC is found. This procedure is done in the same way in which the ROI for the AP plane was found above (step 4.1 above).

In step 4.3, the optimum threshold $\theta_2$ is determined by the range-constrained weighted thresholding method, by specifying $per_O$ and $per_1$ to be 20% and 40% respectively.

In step 4.4, the aVPC plane is segmented using the optimum threshold $\theta_2$, by the same set of sub-steps explained in step 4.3 above.

In step 4.5, the threshold $\theta_2$ is adjusted using anatomical knowledge. Since the vertical line passing through the PC in the vicinity of the S landmark should be interhemispheric fissure voxels, $\theta_2$ should be higher than the gray levels of voxels on the vertical line segment starting from 2 mm above and ending 2 mm below the object voxels with the minimum v coordinate found in step 4.4. If $\theta_2$ is indeed bigger than this value, then it is not changed. However, if it is lower, it is modified to be 5 plus the maximum gray level of the line segment, and the aVPC(u,v) is re-segmented with the modified threshold $\theta_2$, by the same sub-steps as those used to segment the AP plane in step 4.3 above, including the same morpological opening operations.

In step 4.6, lost object voxels are restored. This is done by the following steps:

(a) Object voxels around the object boundaries lost due to the morphological opening operation are restored. This is done by, reclassifying an non-object voxel which has an object boundary voxel as a nearest neighbour and which has a gray level greater than $\theta_2$.

Note, however, that to avoid the sinus/meninges, the restoration is not carried out in the region defined by:

$$|u-pcU|<10 \text{ mm and } |v-minVavp|<3 \text{ mm} \quad (5)$$

where minVavp denotes the minimum v coordinate of object voxels.

(b) Object voxels lost due to the partial volume effect are restored. This is done by reclassifying an non-object voxel having an object boundary voxel as a nearest neighbour and which has a gray level higher than $(\theta_2-10)$. The restoration is not, however, carried out in the region defined by equation (5).

The segmented aVPC after restoration sub-steps (a) and (b) is shown in FIG. 4(c).

In step 4.7, the v coordinate of the S landmark is the minimum v coordinate of all object voxels in aVPC. The v coordinate of S in the aVPC plane is equal to its z coordinate in the full three-dimensional volume.

FIG. 4(c) shows the segmented aVPC slice, and FIG. 4(d) shows the original VPC overlaid by a horizontal line indicating the z coordinate (or equivalently v coordinate) of the S landmark.

In step 5, the position of the I landmark is determined. The VAC plane is a coronal slice parallel to the VPC plane, and passes through the AC. Only the v coordinate of the I landmark is need, and it is the maximum v coordinate of all the cortical voxels on the VAC plane. It is determined by segmenting the VAC plane directly constrained by anatomical knowledge. It is assumed that the maximum difference in the z-coordinate between the AC and the I landmark is no more than 50 mm. We denote that coordinates of the AC in the VAC(u,v) by (acU, acV).

Specifically, the landmark is obtained by the following sub-steps:

In step 5.1, VAC(u,v) is binarised by assigning all voxels with gray levels bigger than $\theta_2$ to be foreground voxels, and the rest as background voxels. The binarised image is denoted as BWVAC1(u,v).

In step 5.2, the region around the AC is connected to make subsequent "seeding" feasible. Here "seeding" means to find connected components from a specified voxel ("seed") with all the voxels in the component being of the same type (i.e. background, foreground or object). The region around the AC is connected by setting the BWVAC1(u,v) to foreground when |v−acV| is smaller than 3 mm.

Step 5.3 employs a vertical line passing through the AC to separate the VAC into left and right halves. The voxels on the vertical line with a v-coordinate greater than acV+3 mm are set to background. That is, BWVAC1(u,v) is set to background when v is bigger than (acVac+3 mm) and u is equal to acU. This has the effect that there is foreground separation in the neck region.

In step 5.4, a morphological opening operation is performed on BWVAC1(u,v) using a 3×3 SE, to give BWVAC2 (u,v). This operation breaks weak connections between the cortex and the skull and between the cortex and the neck.

In step 5.5, a morphological erosion operation is performed using a 3×3 SE, to give BWVAC3(u,v). This operation further breaks the connections between the cortex and the skull and between the cortex and the neck.

In step 5.6, we seed from (acU, acV), to obtain the foreground component. Then, we perform a morphological dilation on the seeded foreground component with a 3×3 SE, to obtain BWVAC4(u,v). The serial operations (erosion followed by seeding and dilation) are intended to break strong connections between the cortex and the skull, and between the cortex and the neck, while retaining the original shape of the cortex.

In step 5.7, the maximum value of v for which a foreground BWVAC4(u,v) voxel exists having u smaller than acU, is found, and denoted as maxVL.

In step 5.8, the maximum value of v for which a foreground BWVAC4(u,v) voxel exists having u not less than acU, is found, and denoted as maxVR.

In step 5.9, the left half of BWVAC4 (u,v) (i.e. the values of u smaller than acU) is restored in two substeps if (maxVL−acV) is smaller than 50 mm:

(a) Firstly, the effects of the morphological opening operation are counteracted, by changing any background voxel which has at least a foreground voxel of BWVAC4(u,v) as one of its 8 immediate neighbours and which has a gray level in VAC(u,v) greater than $\theta_2$ to foreground.

(b) Secondly, the effects of the partial volume effect are counteracted by restoring any background voxel which has a foreground boundary voxel (a foreground boundary voxel is a foreground voxel, within its 8 immediate neighbours there is at least a background voxel) of BWVAC4(u,v) as one of its 8 immediate neighbours and which has a gray level in VAC(u,v) bigger than ($\theta_2$−10) to foreground.

Similarly, the right half of BWVAC4(u,v) (i.e. the half with u not less than acU) is restored by two corresponding steps when maxVR−acV is smaller than 50 mm.

Object voxels are all foreground voxels in this case.

In step 5.10, if both (maxVL−acV) and (maxVR−acV) are smaller than 50 mm, the v coordinate of the I landmark is obtained as the v component of the object voxel in BWVAC4 (u,v) with the biggest value of v. If one of (maxVL−acV) or (maxVR−acV) is smaller than 50 mm and the other is not, the v-coordinate of the I landmark is obtained as the maximum v coordinate of all the object voxels from the side (i.e. the left side or right side) for which the maximum v coordinate of the object voxels is smaller than (50+acV). If both of (maxVL−acV) and (maxVR−acV) are bigger than 50 mm, the v coordinate of the I landmark Is the maximum v coordinate of all the object voxels on the side (i.e. left or right) whose maximum object v coordinate is smaller. Note that the v coordinate of BWVCA(u,v) corresponds to the z coordinate of the dataset.

FIG. 5(*a*) shows the original VAC, FIG. 5(*b*) shows the binarised VAC (i.e. BWVAC1), FIG. 5(*c*) shows the processed foreground (BWVAC4), and FIG. 5(*d*) shows the v coordinate (or equivalently z coordinate) of the I landmark overlaid on the original VAC plane.

Figure 2:
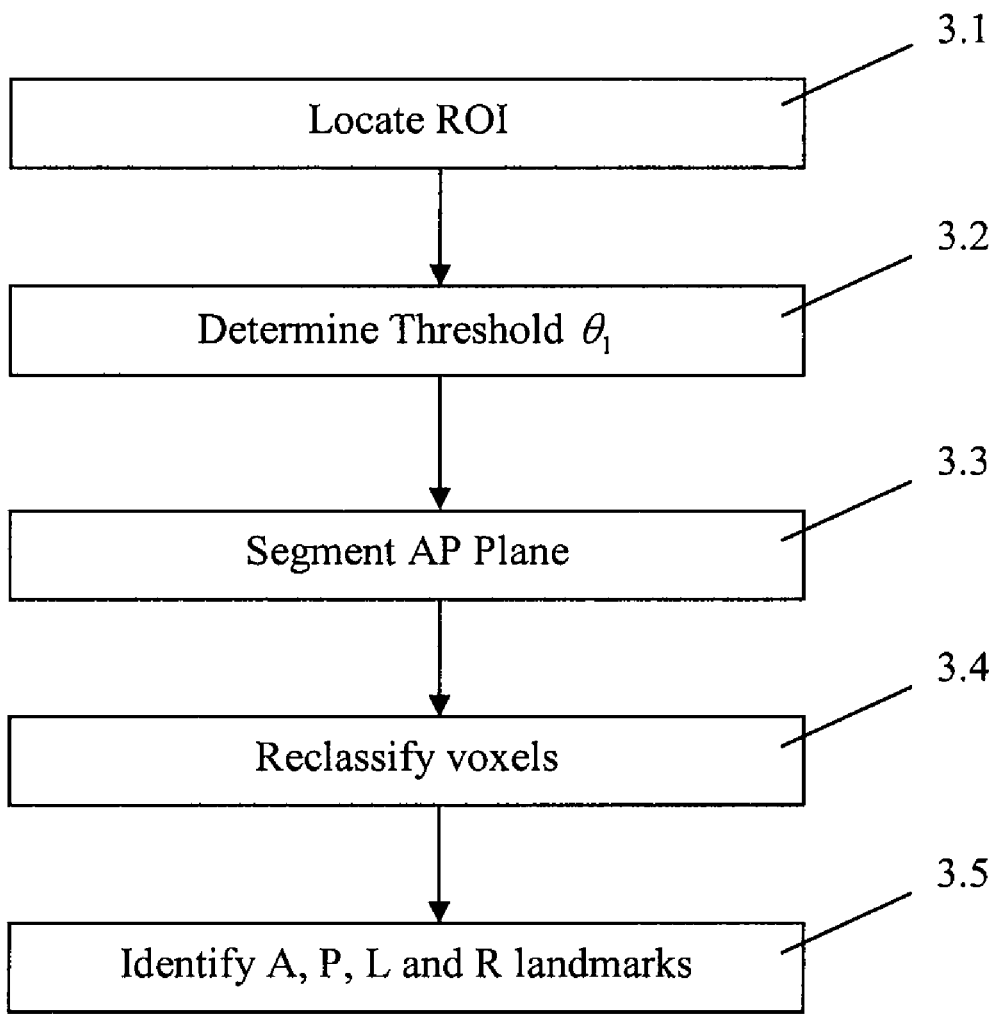
FIG. 2 is a flow chart showing in more detail sub-steps of step 3 of the flow chart of FIG. 1.

Note that the set of sub-steps performed in steps 4 and 5 can be considered as corresponding to those shown in FIG. 2 for finding the A, P, L and R landmarks. That is, a ROI is identified; a threshold is selected (or, in the case of step 5, the threshold used is that same one derived in step 4); a segmentation is performed; then a reclassification is performed; and finally the landmarks are identified.

Although only a single embodiment of the invention has been described in detail, many variations are possible within the scope of the invention as will be clear to a skilled reader.

The invention claimed is:

1. A computer-based method for locating one or more landmarks using an MR image of a brain, the method including the following automatic steps:

(a) identifying a region of interest (ROI) with a plane of the MR image, the plane containing the landmark(s);

(b) binarising the plane of the MR image into foreground and background voxels based on at least one threshold selected using anatomical knowledge, the threshold being selected by maximizing a function which is a sum of variances of voxel intensities below and above the threshold;

(c) identifying a set of object voxels from the foreground voxels, the set of object voxels being formed by a sub-step of excluding from the foreground voxels a plurality of voxels which were only classified as foreground voxels due to proximity of cortical and non-cortical structures;

(d) identifying and restoring object voxels lost during the excluding sub-step of step (c), the restored object voxels being: object voxels located far from the skull, and lost due to the morphological opening operation(s); object voxels located around the boundaries of the object, and lost due to the morphological opening operation(s); and object voxels lost due to the partial volume effect; and (e) identifying the one or more landmarks using the object voxels identified in the steps (c) and (d).

2. A method according to claim 1 in which the step of identifying the object voxels is performed in two stages:

(i) morphological processing which excludes foreground voxels which may not be object voxels, and (ii) restoring voxels which have been incorrectly excluded in the morphological processing.

3. A method according to claim 2 in which the step of identifying the object voxels further includes applying anatomical knowledge to identify the object voxels.

4. A method according to claim 3 in which the anatomical knowledge is knowledge about the expected shapes of cortical and/or non-cortical structures.

5. A method according to claim 1, wherein the threshold is selected by the steps of:

(i) using prior knowledge about the image to derive an intensity range of voxels in said region of interest;

(ii) obtaining a frequency distribution of intensities within said intensity range of voxels within said region of interest; and (iii) using the frequency distribution to derive an intensity threshold.

6. A method according to claim 1 in which said function is a weighted sum defined based on two constants $W_1$ and $W_2$.

7. A method according to claim 6, comprising labeling possible values of voxel intensity by an integer index i and their respective frequencies by h(i), and writing the lower and upper intensities respectively as $r_{low}$ and $r_{high}$, wherein the weighted sum is given by $$\theta_{RCLWV}(W_1, W_2) = \max_{r_k}(Pr(C_1)D(C_1)W_1 + Pr(C_2)D(C_2)W_2),$$

where Pr(.) denotes class probability $$\left(Pr(C_1) = \sum_{i=r_{low}}^{r_k} h(i) \text{ and } Pr(C_2) = \sum_{i=r_k+1}^{r_{high}} h(i)\right), [,]$$

and
$D(C_1)$ and $D(C_2)$ are given by:

$$D(C_1)=(\mu_0-\mu_T)^2 \text{ and } D(C_2)=(\mu_1-\mu_T),$$

where $$\mu_T = \sum_{i=r_{low}}^{r_{high}} i \times h(i), \mu_0 = \sum_{i=r_{low}}^{r_k} i \times h(i), \text{ and } \mu_1 = \sum_{i=r_k+1}^{r_{high}} i \times h(i).$$

8. A method according to claim 1, wherein the steps (a) to (e) are performed repeatedly, in each set of steps identifying at least one corresponding landmark.

9. A method according to claim 1, wherein steps (a) to (d) are performed to locate A, P, L and R landmarks, and wherein
in step (a) the region of interest being defined within the AP plane; and
in step (e) the most anterior and most posterior of the object voxels being taken respectively as the vertical coordinates of the A and P landmarks respectively, and the extreme horizontal components of the object voxels are taken as the horizontal coordinates of the L and R landmarks respectively.

10. A method according to claim 9 wherein step (c) comprises:
performing at least one morphological opening operation on the binarized image obtained in step (b); and
classifying one or more voxels of the image(s) obtained by the opening operation(s) as object voxels or otherwise according to at least one criterion based on distances in the image(s) obtained by the opening operation(s) and anatomical knowledge.

11. A method according to claim 10 in which, prior to classifying the voxels, a maximum distance maxDSkull is obtained from a distance transform of the ROI.

12. A method according to claim 1 wherein steps (a) to (d) are performed to obtain an S landmark, the method comprising:
in step (a), defining the region of interest within a virtual plane obtained from a VPC coronal slice; and
in step (e), identifying the position of the S landmark as the most superior point of the object voxels.

13. A method according to claim 12 wherein step (c) comprises:
performing at least one morphological opening operation on the binarized image obtained in step (b); and
classifying as object voxels one or more voxels of the image(s) obtained by the morphological opening operation(s) if they belong to eight voxels immediately adjacent to an object voxel and if their intensity value in the MR image is higher than a value defined in relation to a second threshold.

14. A method according to claim 1, wherein the set of steps (a) to (d) is performed to identify an I landmark, comprising:
in step (a), defining the region of interest within a VAC plane;
in step (e), defining the I landmark as the most inferior point of the object voxels.

15. A method according to claim 14 in which the threshold is obtained during a preceding process of locating an S landmark.

16. A method according to claim 14 in which, in step (c),
(i) at least one morphological opening operation, and/or
(ii) at least one seeding operation,
are performed on the binarized image obtained in step (b).

17. A method according to claim 16 in which, in step (c), one or more voxels of the image(s) obtained by the morphological opening operation(s) which are not presently classified as object voxels are re-classified as object voxels if they are one of the eight immediate neighbours of an object voxel and if their intensity value in the MR image is higher than a value defined in relation to a second threshold.

18. A method according to claim 14, wherein the left and right halves of the brain are treated separately, and the object voxels used to obtain the location of the I landmark relate to a selected half of the brain, the selected half of the brain having been selected based on a predefined criterion.

19. A system for locating one or more landmarks using an MR image of a brain, the system including:
an interface to receive data encoding the MR image; and
a processor arranged to perform the following steps:
(a) identifying a region of interest with a plane of the MR image, the plane containing the landmark(s);
(b) binarising the plane of the MR image into foreground and background voxels based on at least one threshold selected using anatomical knowledge, the threshold being selected by maximizing a function which is a sum of variances of voxel intensities below and above the threshold;
(c) identifying a set of object voxels from the foreground voxels, the set of object voxels being formed by a sub-step of excluding from the foreground voxels a plurality of voxels which were only classified as foreground voxels due to proximity of cortical and non-cortical structures;
(d) identifying and restoring object voxels lost during the excluding sub-step of step (c), the restored object voxels being: object voxels located far from the skull, and lost due to the morphological opening operation(s); object voxels located around the boundaries of the object, and lost due to the morphological opening operation(s); and object voxels lost due to the partial volume effect; and
(e) identifying the one or more landmarks using the object voxels identified in the steps (c) and (d).

* * * * *

UNITED STATES PATENT AND TRADEMARK OFFICE
CERTIFICATE OF CORRECTION

| | | |
|---|---|---|
| PATENT NO. | : 7,715,607 B2 | Page 1 of 1 |
| APPLICATION NO. | : 10/550366 | |
| DATED | : May 11, 2010 | |
| INVENTOR(S) | : Qingmau Hu et al. | |

It is certified that error appears in the above-identified patent and that said Letters Patent is hereby corrected as shown below:

Claim 7, Col, 11, Line 22, delete "[,]" after formula.

Claim 7, Col. 11, Line 25, delete "$D(C_2) = (\mu_1 - \mu_T)$" and insert -- $D(C_2) = (\mu_1 - \mu_T)^2$ -- therefor.

Signed and Sealed this

Seventeenth Day of August, 2010

David J. Kappos
*Director of the United States Patent and Trademark Office*